United States Patent Office 3,755,551
Patented Aug. 28, 1973

3,755,551
REDUCTION OF SULFUR DIOXIDE
Billy W. Bridwell, Parsippany, Emery J. Carlson, Chatham, Raymond H. Edgecomb, Somerville, and William E. Watson, Tabor, N.J., assignors to Allied Chemical Corporation, New York, N.Y.
No Drawing. Continuation of application Ser. No. 809,996, Mar. 24, 1969. This application May 27, 1971, Ser. No. 150,948
Int. Cl. C01b 17/04
U.S. Cl. 423—570
12 Claims

ABSTRACT OF THE DISCLOSURE

This invention relates to a method for the reduction of sulfur dioxide by a process which comprises converting the sulfur dioxide to elemental sulfur and/or other gaseous sulfur compounds in the presence of a calcium aluminate catalyst and gaseous hydrocarbon at a temperature within the range from 1500° F. to 2600° F.

---

This application is a continuation of application Ser. No. 809,996 filed Mar. 24, 1969, and now abandoned.

Sulfur dioxide is found in a great many industrial gases emanating from plants involved in roasting, smelting and sintering sulfide ores, e.g. pyrites, or gases from power plants burning high sulfur coal or other sulfurous ores or other industrial operations involving the combustion of sulfur bearing fuels, such as fuel oil, in refineries. As can be readily appreciated, the emission of sulfur dioxide in these gases presents not only a health hazard by contaminating the surrounding atmosphere, but results in a loss of valuable sulfur value. While it has previously been proposed to produce elemental sulfur from gases containing sulfur dioxide, there has not been until now a commercially feasible process for the reduction of sulfur dioxide to elemental sulfur.

Hydrogen, carbon monoxide and gaseous hydrocarbons previously have been used in the reduction of sulfur dioxide to elemental sulfur. Generally, when gaseous hydrocarbons have been employed the temperatures necessary for an efficient reduction of the sulfur dioxide to sulfur has been in excess of 1500° F. and as high as 2600° F. However, as temperatures within this range are employed for the reduction of sulfur dioxide, the materials previously employed as catalyst, e.g., bauxite, alumina, silica, calcium sulfide and the like, have been found to be inefficient or deteriorate rapidly at an uneconomical rate. Accordingly, the full range of operable temperatures which may be utilized in a commercial operation, particularly temperatures in excess of 1850° F. have not been previously feasible. A solution to this problem would be to employ carbon monoxide and hydrogen, reducing agents which permit conversion of the sulfur dioxide to elemental sulfur at temperatures below about 1500° F. at an efficient rate. However, some plants which emit sulfur dioxide gases generally do not have readily available to them large quantities of these reducing agents. On the other hand, gaseous hydrocarbons generally are readily available at a relatively low cost, thus providing an economically feasible process for the reduction of sulfur dioxide.

It has now been found that an economically feasible and commercial operation may be practiced for the reduction of sulfur dioxide by contacting it with at least one reducing agent selected from hydrogen and a gaseous hydrocarbon in the presence of a calcium aluminate catalyst at temperatures ranging from 1500° F. to 2600° F. While it previously has been reported (U.S. Pat. 2,050,708) that calcium aluminate may be used in the production of sulfur by the reduction of sulfur dioxide employing carbon monoxide as the reducing agent, a reported drawback in the use of this material is that if the temperature is too high the composition of the cement (calcium aluminate) is changed and the catalytic effect weakened. Therefore, it was totally unexpected in the reduction of sulfur dioxide to sulfur using one of the aforementioned reducing agents, particularly a gaseous hydrocarbon, at temperatures within the range from 1500° F. to 2600° F. to find calcium aluminate demonstrates not only acceptable activity, but catalytic activity better than those catalysts previously suggested for use, i.e. bauxite, alumina, quartz, silica, calcium sulfide and the like.

The sulfur dioxide which is reduced in the present process may be essentially pure or it may comprise a small percent as in an industrial waste gas, wherein the sulfur dioxide content may vary from less than about 1% to up to about 16 or more percent, the other components comprising essentially oxygen, nitrogen, carbon dioxide and water vapor.

As reducing agents hydrogen or any of the gaseous hydrocarbons may be employed. The preferred gaseous hydrocarbons for use in the present process are the normally gaseous hydrocarbons which contain about 1 to 4 carbon atoms and include natural gas, which is a mixture comprising methane, ethane, propane, the butanes, the pentanes, nitrogen, and carbon dioxide; methane, ethane, propane and the butanes. The choice of the hydrocarbon is based on cost rather than technical considerations. Hydrogen may be employed individually or combined as by-product gases of other chemical reactions; for instance producer gas, water gas, and synthesis gas, each of which contains hydrogen in various proportions. Other gases wherein hydrogen is the predominant component may be effectively utilized so long as they are capable of reducing the sulfur dioxide at an efficient rate.

As mentioned above, the temperature necessary to effect efficient reaction particularly if the normally gaseous hydrocarbon is used as the reducing agent for the sulfur dioxide should be in excess of about 1500° F. In the present process, temperatures maintained within the range of about 1500° F. and 2600° F., preferably 1700 to 2400° F., have been found suitable.

The catalyst which has been found to be unexpectedly effective in the conversion of sulfur dioxide to elemental sulfur and/or other gaseous sulfur compounds, such as hydrogen sulfide, carbonyl sulfide, and carbon disulfide, at temperatures from 1500° to 2600° F. in the presence of one of the aforementioned reducing agents is calcium aluminate which may be a naturally occurring mineral, but preferably is a synthetic composition, such as commercially available calcium aluminate prepared by firing aluminum oxide, such as Bayer alumina, and lime (calcium oxide) together at high temperatures. The calcium aluminate which may be employed as a catalyst in the present invention may have an alumina to calcium oxide molar ratio in the range of about 0.5:1 to 6:1, with an especially preferred alumina to calcium oxide molar ratio being in the range of about 1:1 to 3:1. Calcium aluminates which may be formed include: $Ca_3Al_2O_6$ ($3CaO \cdot Al_2O_3$); $Ca_{12}Al_{14}O_{33}$ ($12CaO \cdot 7Al_2O_3$) $CaAl_2O_4$ ($CaO \cdot Al_2O_3$); $CaAl_4O_7$ ($CaO \cdot 2Al_2O_3$); and $CaAl_{12}O_{19}$ ($CaO \cdot 6Al_2O_3$). Alumina ($Al_2O_3$) is also found in commercially available material. The presence of any one or more of these forms of calcium aluminate may be found in the catalyst of the present invention. The presence of impurities in the calcium aluminate, e.g. iron oxides, $MgO$, $TiO_2$ and $Na_2O$ should be minimized and preferably kept to a level in the order of less than about 5% by weight of the catalyst. At temperatures employed in the present process it has been found that the presence of these oxides, other than alumina and lime, adversely effect the efficacy of the calcium aluminate catalyst in the reduction of the sulfur dioxide. It is theorized that at the high temperatures used in this process, i.e. in excess of 1850° F., these impurities promote fusion and close the pores of the catalyst, thereby causing a decrease in catalytic activity. Small amounts of $SiO_2$ which form calcium aluminum silicates may be tolerated without adverse effects.

Preferably the calcium aluminate is combined with a suitable refractory filler material. Suitable materials include alumina prepared from aluminum hydrates such as bauxite and diaspore, reclay, flint clay, alumina refractory materials aluminum ores and the like. Preferably, the refractory material is alumina based. The amount of refractory material which may be employed may vary up to about 95% by weight. Preferably, however, the refractory material should be about 50 to 80% in order to obtain a fast, efficient conversion of sulfur dioxide to sulfur and/or other gaseous compounds as well as maintain good physical properties. Since calcium aluminate upon addition of water hydrates and sets, the calcium aluminate catalyst may be molded or formed into any suitable shape for use as a catalyst in a reactor. For instance, the refractory material, in the desired proportion, may be mixed with the calcium aluminate. After water is added, the mixture may be either permitted to set and thereafter broken up into suitably sized pieces or the mixture, when set, molded or pelletized in any desired form, such as cylinders or spheres.

The reduction of sulfur dioxide employing a gaseous hydrocarbon as reducing agent is preferably carried out with an excess of hydrocarbon in order to promote the reduction of sulfur dioxide to elemental sulfur and/or sulfur-containing gases with the major proportion of the products being sulfur and/or hydrogen sulfide. For instance, in U.S. Pat. 3,199,955 there is disclosed a three-step process for converting sulfur dioxide to elemental sulfur. In the first step sulfur dioxide is reacted with a gaseous hydrocarbon at temperatures maintained below 1000° C. in the reactor wherein approximately 40 to 60% of the sulfur dioxide feed is converted to elemental sulfur. The remaining portion of the reaction product contains one or more of hydrogen sulfide, carbonyl sulfide, carbon disulfide and sulfur dioxide. In the second stage of that process the carbonyl sulfide and carbon disulfide is reacted in the presence of a catalytic material and some sulfur dioxide at temperatures of about 390° C. to convert the carbonyl sulfide and carbon disulfide to carbon dioxide and sulfur. The third step of this process is the well known Claus reaction wherein hydrogen sulfide and sulfur dioxide are reacted at temperatures in the order of about 250° C. to produce additional elemental sulfur and water vapor. This three-step process may be adopted in using the present process wherein the calcium aluminate will be the catalyst in the first step and temperatures as high as 2600° F. may be employed in the reduction of sulfur dioxide with the aforementioned reducing agents, particularly a gaseous hydrocarbon, to increase the rate of reaction.

The equipment which may be employed in the reduction of sulfur dioxide may be that conventionally employed, such as that disclosed in U.S. Pat. 3,199,955. The calcium aluminate catalyst may be either in the form of a static bed such as pellets, rods or the like, or it may be in the form of a fluid bed, maintained in suspension by the flow rates of the reactants as they pass through the reaction zone. Preferably, however, the reactants are passed in a co-current fashion through a static bed of calcium aluminate catalyst. Instead of a single reaction zone, it may be desirable to employ one or more additional reaction zones in order to handle a larger volume of sulfur dioxide.

In order to better understand the workings of the above described process, the following examples are offered.

EXAMPLE I

A calcium aluminate catalyst was prepared by mixing calcium aluminate with diaspore in the ratio of 1 part to 3 parts and subsequently mixing with a proper amount of water to secure a good set. The catalyst was molded into rods, allowed to set, dried at 220° F. and heated at 1800° F. for about 2 to 3 hours. Into a 2-inch diameter tubular reactor was introduced the calcium aluminate catalyst and a mixture of 861 cc./min. of $SO_2$, 458 cc./min. of $CH_4$, 5660 cc./min. of $N_2$ and 973 cc./min. of water vapor was passed over the catalyst at 2000° F. The exit gas analysis on a dry, sulfur-free basis was 6.14% $Co_2$, 0.6% CO, 0.19% COS, 3.29% $H_2S$, 1.74% $SO_2$ and 1.1% $H_2$; methane and $CS_2$ were not detected in the exit gas stream. By material balance, the conversion of $SO_2$ to sulfur was 60%, to $H_2S$ was 25%, to COS was 1.5%; 13.5% of the $SO_2$ feed was not converted.

EXAMPLE II

A calcium aluminate diaspore catalyst was prepared in a manner similar to the one prepared in Example I, except that it was formed into the shape of balls. Into a 2-inch diameter tubular reactor was introduced the calcium aluminate catalyst and a mixture of 865 cc./min. of $SO_2$, 130 cc./min. of butane, 59% cc./$N_2$ and 1050 cc./min. of water vapor was passed down through the catalyst bed at a temperature of 2000° F. The exit gases were cooled and analyzed on a dry, sulfur-free basis as follows: 4.87% $CO_2$, 1.2% CO, 0.30% COS, 0.76% $H_2S$, 0.68% $SO_2$ and 0.65% $H_2$; $CS_2$ and other hydrocarbons were not detected. By material balance the conversion of $SO_2$ to sulfur was 81.5%, to $H_2S$ was 8.0%, to COS was 3.25%; 7.25% of the $SO_2$ feed was not converted.

A run similar to those conducted in Examples I and II was conducted, except that the reducing agent employed was carbon monoxide and the temperature was 1600° F. The gas composition entering the reactor containing the calcium aluminate catalyst comprised a mixture of 20% carbon monoxide, 10% sulfur dioxide and 70% nitrogen. The flow rate of the gas mixture through the catalyst bed was 9515 cc./min. The exit gases were cooled and analyzed on a dry, sulfur-free basis as follows: 18.5% $CO_2$, 0.6% CO, 0.4% COS and 1.2% $SO_2$; $CS_2$ was not detected. By material balance the conversion of $SO_2$ to sulfur was 84% and to COS was 4%; 12% of the $SO_2$ feed was not converted.

EXAMPLE III

Another run was conducted similar to the previous runs except that the reducing agent employed was hydrogen and the temperature was 1500° F. The gas composition entering the reactor comprised a mixture of 20% hydrogen, 10% sulfur dioxide and 70% nitrogen. The flow rate of the mixture through the catalyst bed was 10,250 cc./min. The exit gases were cooled and analyzed on a dry, sulfur-free basis as follows: 0.9% $H_2S$, 1.8% $SO_2$ and 0.8% $H_2$. By material balance the conversion of $SO_2$ to sulfur was 73%, to $H_2S$ was 9%; 18% of the $SO_2$ feed was not converted.

EXAMPLE IV

In order to compare the catalytic activity of the calcium aluminate catalyst of the present invention with other materials a variable called "Maximum Recoverable Sulfur" (hereinafter referred to as "MRS") was developed. The MRS is the ratio of the moles of sulfur which theoretically may be recovered to the moles of sulfur dioxide fed times 100. Mathematically, Percent MRS
$$= \frac{[S + 3/2 \,(H_2S + COS + 2CS_2)] \text{ (moles out)}}{SO_2 \text{ (moles in)}} \times 100$$

If MRS equals 100%, then the ratio of the total atoms of sulfur in the sulfur-bearing compounds, other than sulfur dioxide, to the moles of sulfur dioxide in the outlet gas is 2:1. The activity of the catalyst can be expressed as the ratio of sulfur dioxide to reducing agent required to achieve 100% MRS. In the following runs methane was used as the reducing agent. Thus, as the ratio of sulfur dioxide to reducing agent required to achieve 100% MRS. In the following runs methane was used as the reducing agent. Thus, as the ratio of sulfur dioxide to methane approaches 2:1, the more acceptable the catalyst. These data may be found in Table I.

TABLE I

| Material: | $SO_2/CH_4$ at 100% MRS at 2000° F. |
|---|---|
| CA-25 (Alcoa) [1] | 1.90 |
| Lumnite Cement (Universal Atlas, Division of U.S. Steel Corp.) [2] | 1.87 |
| Diaspore—CA-25 [3] | 1.89 |
| Diaspore—Lumnite [3] | 1.87 |
| Dead Burned Flint Clay—CA-25 [3] | 1.87 |
| Silica (Johns-Manville—Type 5) | 1.86 |
| Harshaw $Al_2O_3$ | 1.83 |
| Diaspore | 1.83 |
| Bauxite | 1.82 |
| SAHT 99, $Al_2O_3$ (Carborundum Co.) | 1.82 |
| Alcoa F110, $Al_2O_3$ | 1.81 |
| Bauxite-Lumnite | 1.80 |
| CaS | 1.77 |
| Quartz | <1.50 |

[1] High purity calcium aluminate.
[2] Lower purity calcium aluminate.
[3] Ratio of refractory to calcium aluminate is 3:1.

EXAMPLE 5

Another series of runs were conducted in which the percent maximum recoverable sulfur (MRS) was determined at the point where the ratio of sulfur dioxide to methane is maintained at the stoichiometric ratio of 2:1. Reaction temperatures were maintained at 1850° and 2000° F. Also, catalytic materials which have been precalcined to temperatures between 2400 to 2900° F. were tested. Data on the percent shrinkage of the catalytic material tested at temperature of 2000°, 2200° and 2400° F. were also calculated. It is known that a material which shrinks also loses its catalytic surface because of local sintering, closing of pores and accompanying loss of active sites. These data appear in Table II.

TABLE II

Percent MRS at—$SO_2/CH_4$ = 2 (stoichiometric ratio)

| | As is— | | After calcining at 2,400° F. | | Shrinkage, percent | | |
|---|---|---|---|---|---|---|---|
| Temperature of activity test | 1,850° F. | 2,000° F. | 1,850° F. | 2,000° F. | 2,000° F. | 2,200° F. | 2,400° F |
| Catalysts: | | | | | | | |
| Alcoa CA-25 | 97 | 96 | 94 | 90 | Nil | | 5 |
| Diaspore (2,400° F. calcined)—Alcoa CA-25 | 95 | 94 | 94 | 94 | Nil | | 10 |
| Dead burned flint clay [1] CA-25 | 96 | 94 | 89 | 91 | Nil | | 2 |
| Porocel (activated bauxite) [2] | (³) | 95 | 81 | 94 | 4 | 15 | 45 |
| Flint clay | 82 | 93 | [1] 0 | [1] 47 | 28 | | |
| Bauxite | | 90 | | | 8 | 16 | 36 |
| Diaspore | | 91 | | [4] 12 | [4] 85 | 4 | 10 |
| Silica (Johns Manville-Type 5) | | 94 | | [5] 20 | 1 | 19 | |
| CaS | | 90 | | (⁶) | | | |

[1] Calcined at 2,670° F.
[2] Englehard Minerals & Chemicals Corp.
[3] Est. 95+.
[4] Calcined to 2,900° F.
[5] Silica brick.
[6] Chemically unstable.

EXAMPLE VI

In this example a series of runs were conducted at temperatures of 1850° F. and 2000° F., respectively. The activity of the catalyst expressed as the ratio of sulfur dioxide to methane required to achieve 100% MRS was determined. The catalyst system employed was pre-conditioned at various temperatures to determine what effect such conditioning had on the activity of the catalyst. These data appear in Table III below.

TABLE III

| Catalyst | Preconditioning temperature, ° F. | $SO_2/CH_4$ at 100% MRS | | Percent shrinkage | |
|---|---|---|---|---|---|
| | | 1,850° F. | 2,000° F. | In bed | 2,400° F8 |
| Diaspore | 1,000 | | 1.83 | Nil | |
| Do | 2,400 | 1.81 | 1.85 | Nil | |
| Diaspore (dead burned) | 2,900 | <1.50 | <1.50 | Nil | |
| Raw flint clay, as-is | | 1.62 | 1.85 | | |
| Dead burned flint clay | 2,400 | <1.50 | <1.50 | | |
| CA-25 | 1,800 | 1.93 | 1.90 | Nil | 11 |
| CA-25 | 2,400 | 1.88 | 1.81 | Nil | |
| CA-25—Diaspore [1] | 1,800 | 1.91 | 1.89 | Nil | 18 |
| Do | 2,400 | 1.89 | 1.87 | Nil | |
| CA-25—Dead burned flint clay [2] | 1,800 | 1.92 | 1.87 | | |
| Do | 2,400 | 1.71 | 1.80 | | |

[1] 1 part CA-25, and 3 parts diaspore.
[2] 1 part CA-25, and 3 parts dead burned flint clay.

From these data it may be seen that while the initial activity of the calcium aluminate alone is high, i.e., CA-25, a more temperature stable catalyst is obtained by mixing the calcium aluminate with diaspore. These catalysts were found to be superior to activated alumina after calcination at 2400° F.

What is claimed is:

1. A process for reducing sulfur dioxide to elemental sulfur and at least one gaseous sulfur compound selected from the group consisting of hydrogen sulfide, carbonyl sulfide and carbon disulfide which comprises contacting said sulfur dioxide with a calcium aluminate catalyst at a temperature within the range from 1500° F. to 2600° F. in the presence of a reducing agent selected from a normally gaseous hydrocarbon of 1 to 4 carbon atoms.

2. The process of claim 1 wherein the calcium aluminate is combined with a refractory material.

3. The process of claim 1 wherein the calcium aluminate is combined with an alumina-based refractory material.

4. The process of claim 1 wherein the calcium aluminate is combined with diaspore.

5. The process of claim 1 wherein the calcium aluminate is combined with flint clay.

6. The process of claim 1 wherein the calcium aluminate is combined with an aluminum hydrate.

7. The process of claim 1 wherein the calcium aluminate is combined with bauxite.

8. The process of claim 1 wherein the calcium aluminate has an alumina to calcium oxide molar ratio within the range from about 0.5:1 to about 6:1.

9. The process of claim 1 wherein the temperature is within the range of about 1700° F. to 2400° F.

10. The process of claim 1 wherein the gaseous hydrocarbon is natural gas.

11. The process of claim 1 wherein the gaseous hydrocarbon is methane.

12. The process of claim 1 wherein the calcium aluminate catalyst contains less than a total of 5% by weight of the catalyst of iron oxides, MgO, $TiO_2$, $Na_2O$ and $SiO_2$.

References Cited

UNITED STATES PATENTS

| | | | |
|---|---|---|---|
| 1,941,702 | 1/1934 | Maier | 23—226 |
| 2,050,708 | 8/1936 | Lindblad | 23—226 |
| 2,090,828 | 8/1937 | Beckman | 23—226 X |
| 2,270,427 | 1/1942 | Fleming et al. | 23—226 X |
| 2,361,825 | 10/1944 | Dommani | 23—226 |

FOREIGN PATENTS

| | | | |
|---|---|---|---|
| 443,008 | 2/1936 | Great Britain | 23—226 |
| 84,978 | 12/1935 | Sweden | 23—226 |

OTHER REFERENCES

Kirk-Othmer; Encyclopedia of Chemical Technology, vol. 4; Sci. Publishers; N.Y.; 1964, p. 696.

Applebey, M. P.; "Journal of the Society of Chemical Industry," May 1937; pp. 139T–146T.

Cole, R. J.; "Industrial & Engineering Chemistry," December 1950, pp. 2258–69.

GEORGE O. PETERS, Primary Examiner

U.S. Cl. X.R.

423—416, 443, 564